US010850345B2

(12) United States Patent
Yamaashi et al.

(10) Patent No.: US 10,850,345 B2
(45) Date of Patent: Dec. 1, 2020

(54) SHAPING DEVICE FOR ROLLER ELECTRODE FOR SEAM WELDING

(71) Applicant: HONDA MOTOR CO., LTD., Tokyo (JP)

(72) Inventors: Kazuhiko Yamaashi, Tochigi-Ken (JP); Tetsuya Kodama, Tochigi-Ken (JP); Noriaki Shigematsu, Tochigi-Ken (JP); Hitoshi Yoshimichi, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 474 days.

(21) Appl. No.: 15/532,759

(22) PCT Filed: Dec. 1, 2015

(86) PCT No.: PCT/JP2015/083702
§ 371 (c)(1),
(2) Date: Jun. 2, 2017

(87) PCT Pub. No.: WO2016/088739
PCT Pub. Date: Jun. 9, 2016

(65) Prior Publication Data
US 2018/0015563 A1    Jan. 18, 2018

(30) Foreign Application Priority Data

Dec. 5, 2014   (JP) ................... 2014-247121
Nov. 25, 2015  (JP) ................... 2015-229484

(51) Int. Cl.
*B23K 11/30*    (2006.01)
*B21B 1/16*     (2006.01)
*B21B 15/00*    (2006.01)

(52) U.S. Cl.
CPC ............ *B23K 11/3036* (2013.01); *B21B 1/16* (2013.01); *B21B 15/0007* (2013.01);
(Continued)

(58) Field of Classification Search
CPC ... B23K 11/3036; B23K 11/3063; B21B 1/16; B21B 15/0007; B21B 2015/0021;
(Continued)

(56) References Cited

U.S. PATENT DOCUMENTS

2011/0146363 A1* 6/2011 Tezawa .............. B23K 11/3063
72/199

FOREIGN PATENT DOCUMENTS

JP    58-116174 U    8/1983
JP    62-159987 U    10/1987
(Continued)

OTHER PUBLICATIONS

Office Action dated Dec. 19, 2017 issued over the corresponding Japanese Patent Application 2015-229484 with the English translation thereof.
(Continued)

*Primary Examiner* — Peter Dungba Vo
*Assistant Examiner* — Azm A Parvez
(74) *Attorney, Agent, or Firm* — Carrier Blackman & Associates, P.C.; Joseph P. Carrier; Jeffery T. Gedeon

(57) ABSTRACT

Provided is a shaping device for a roller electrode for seam welding that prepares shapes for a first roller electrode and a second roller electrode attached to an arm of a robot. This shaping device is provided independently from the robot and disposed within rotational range of the arm, and is provided with a first roller and a second roller that are disposed on a line orthogonal to a line joining the rotational centers of the first and second roller electrodes and are in contact with the outer circumferences of the first and second roller electrodes.

3 Claims, 16 Drawing Sheets

(52) U.S. Cl.
CPC ... *B23K 11/3063* (2013.01); *B21B 2015/0021* (2013.01); *Y10T 29/53204* (2015.01)

(58) Field of Classification Search
CPC ... B23B 5/00; Y10T 29/53204; Y10T 29/532; Y10T 29/5313; Y10T 29/53
USPC ..... 29/746, 745, 729, 700; 72/199, 236, 234
See application file for complete search history.

(56) References Cited

FOREIGN PATENT DOCUMENTS

| | | | |
|---|---|---|---|
| JP | 02-097979 U | | 8/1990 |
| JP | H0297979 U | * | 8/1990 |
| JP | 02-114181 U | | 9/1990 |
| JP | 06-015459 A | | 1/1994 |
| JP | 11-309585 A | | 11/1999 |
| JP | 11309585 A | * | 11/1999 |
| JP | 3132416 U | | 6/2007 |
| JP | 2010-029883 A | | 2/2010 |
| JP | 5041265 B2 | | 10/2012 |

OTHER PUBLICATIONS

PCT/ISA/210 from PCT/JP2015/083702 with the English translation thereof.

* cited by examiner

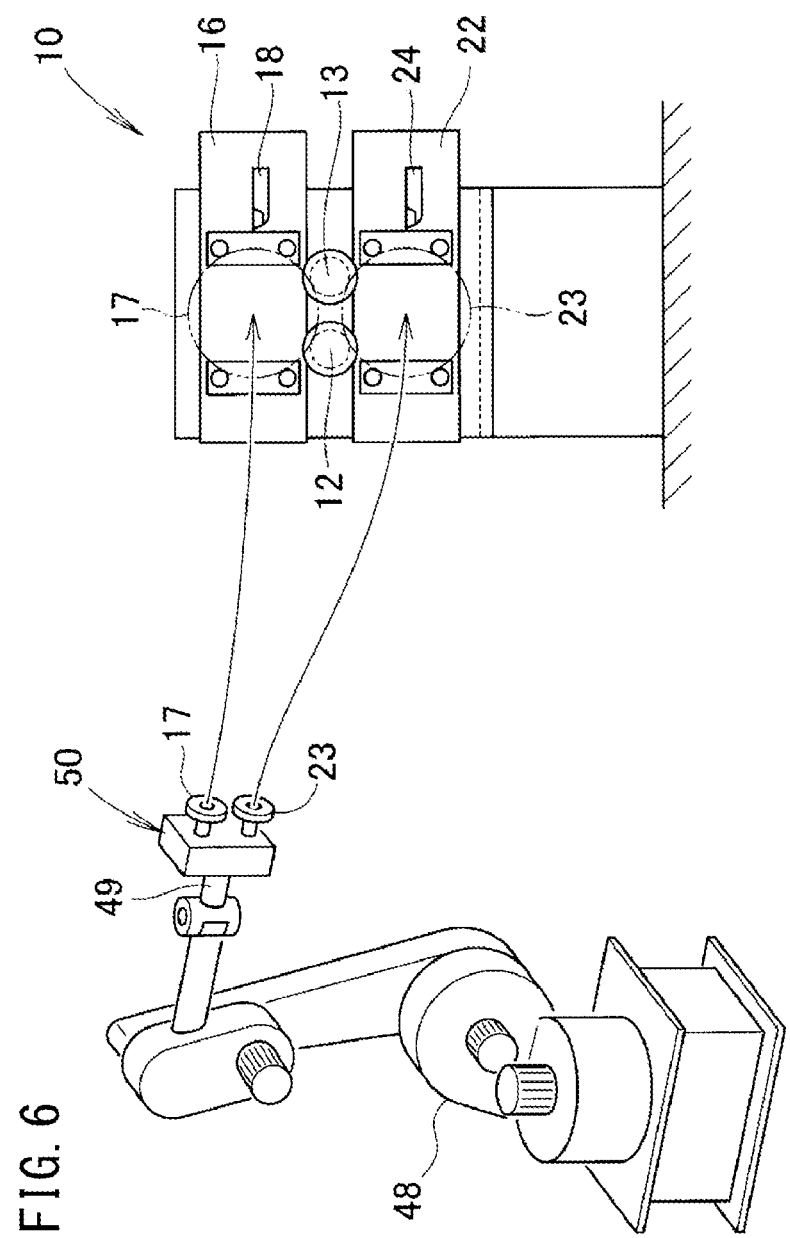

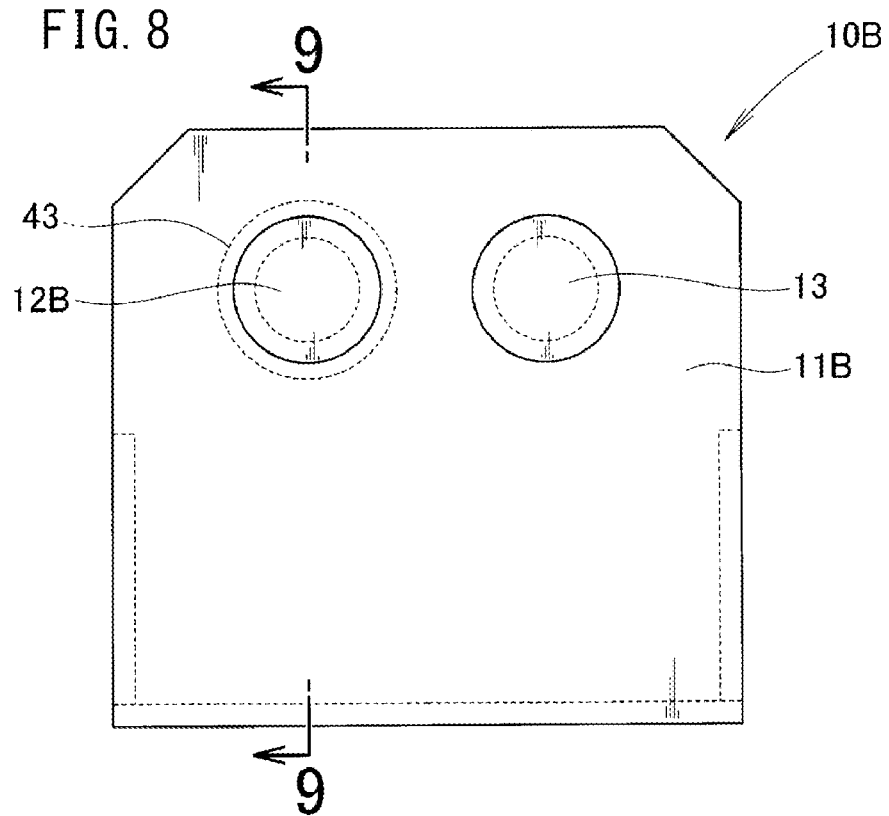

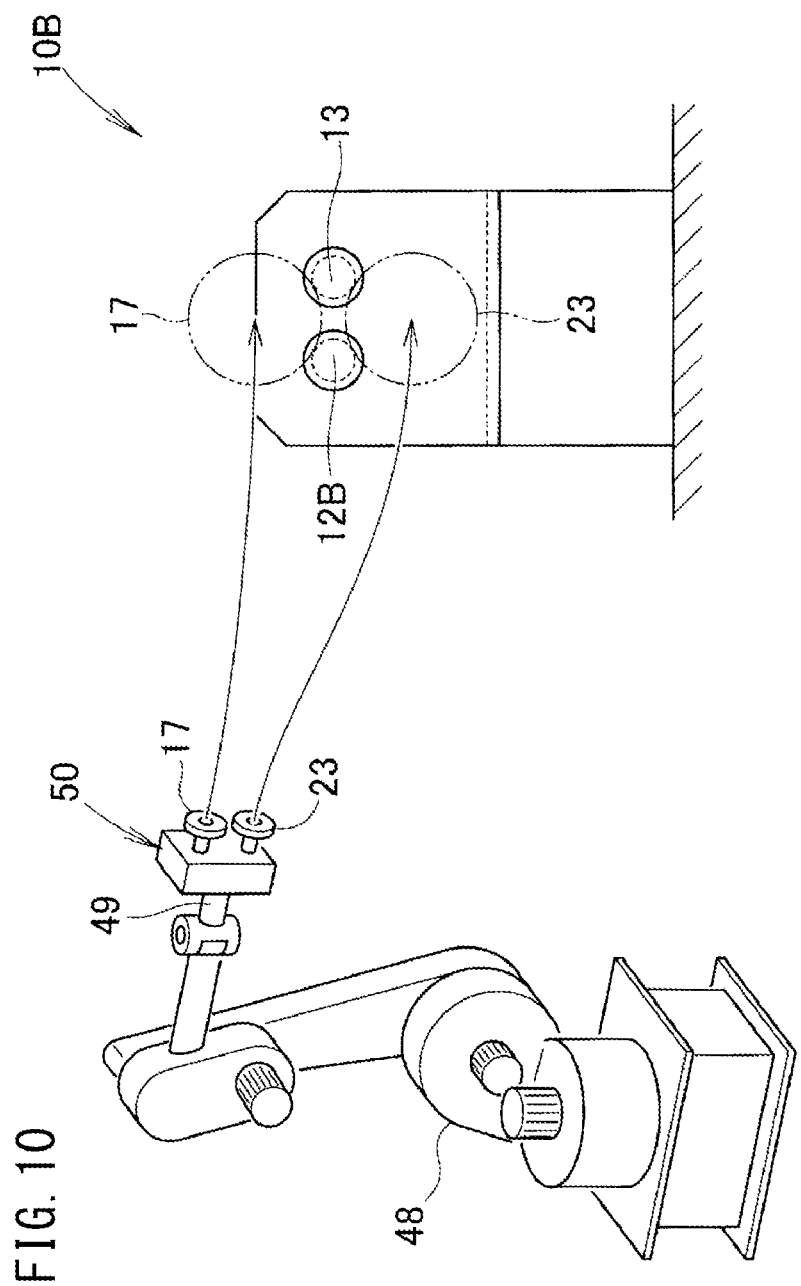

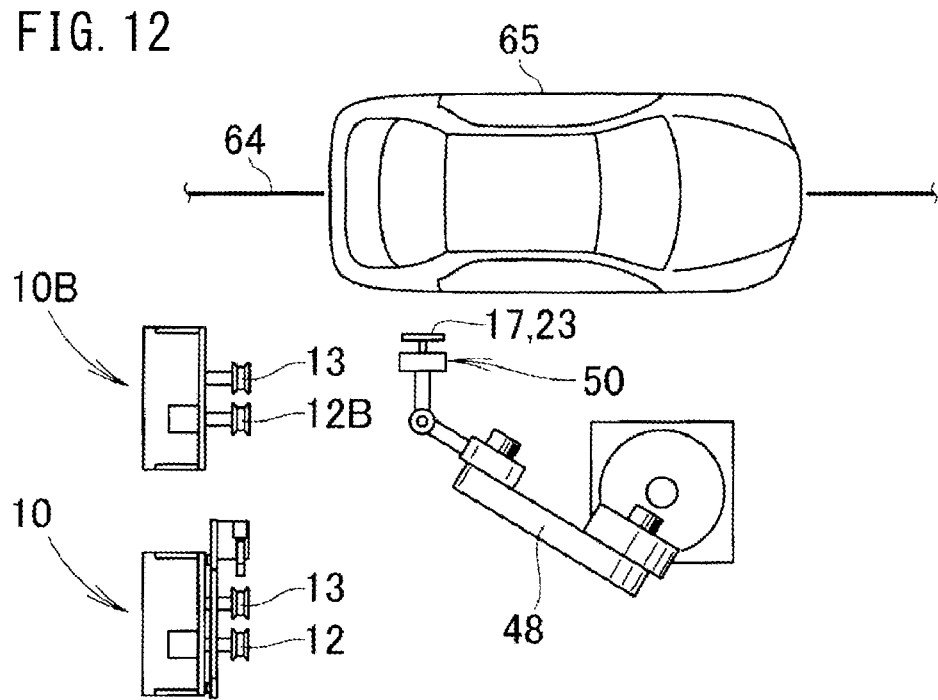

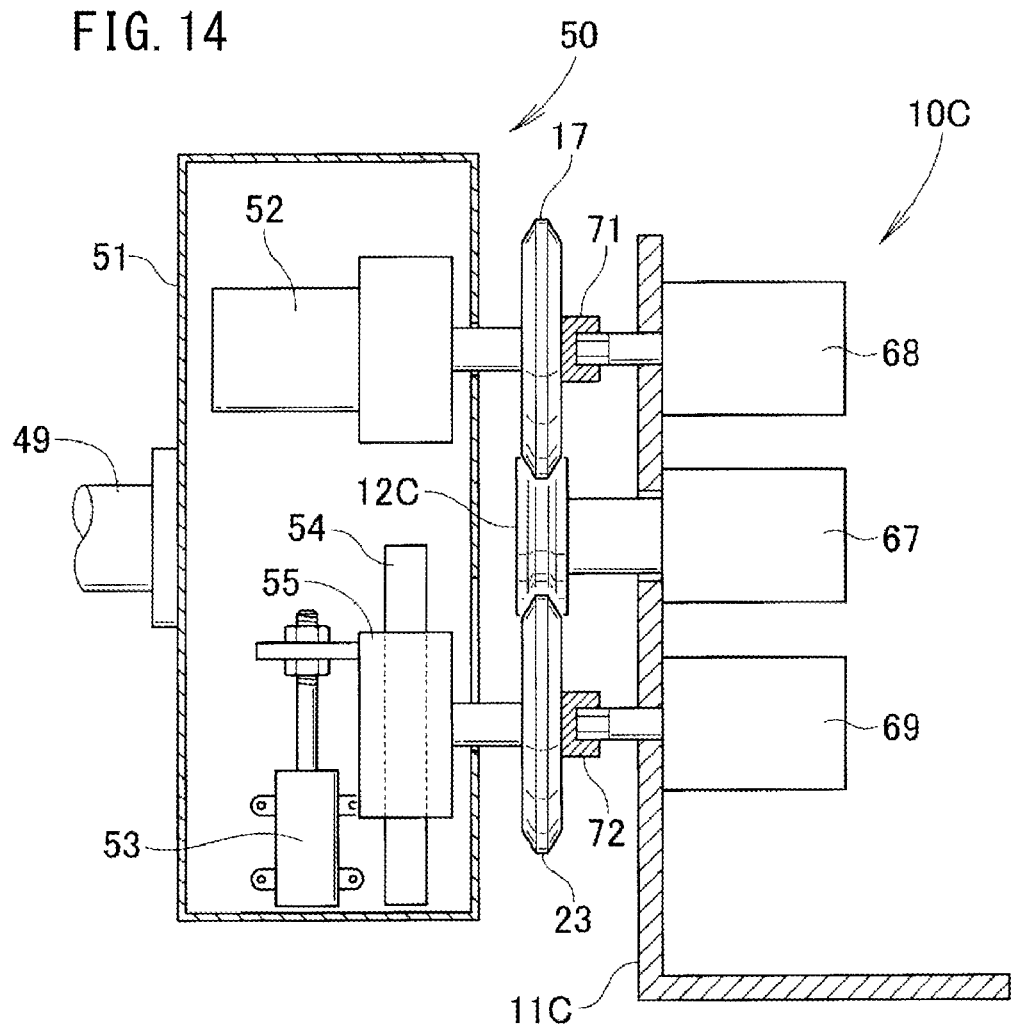

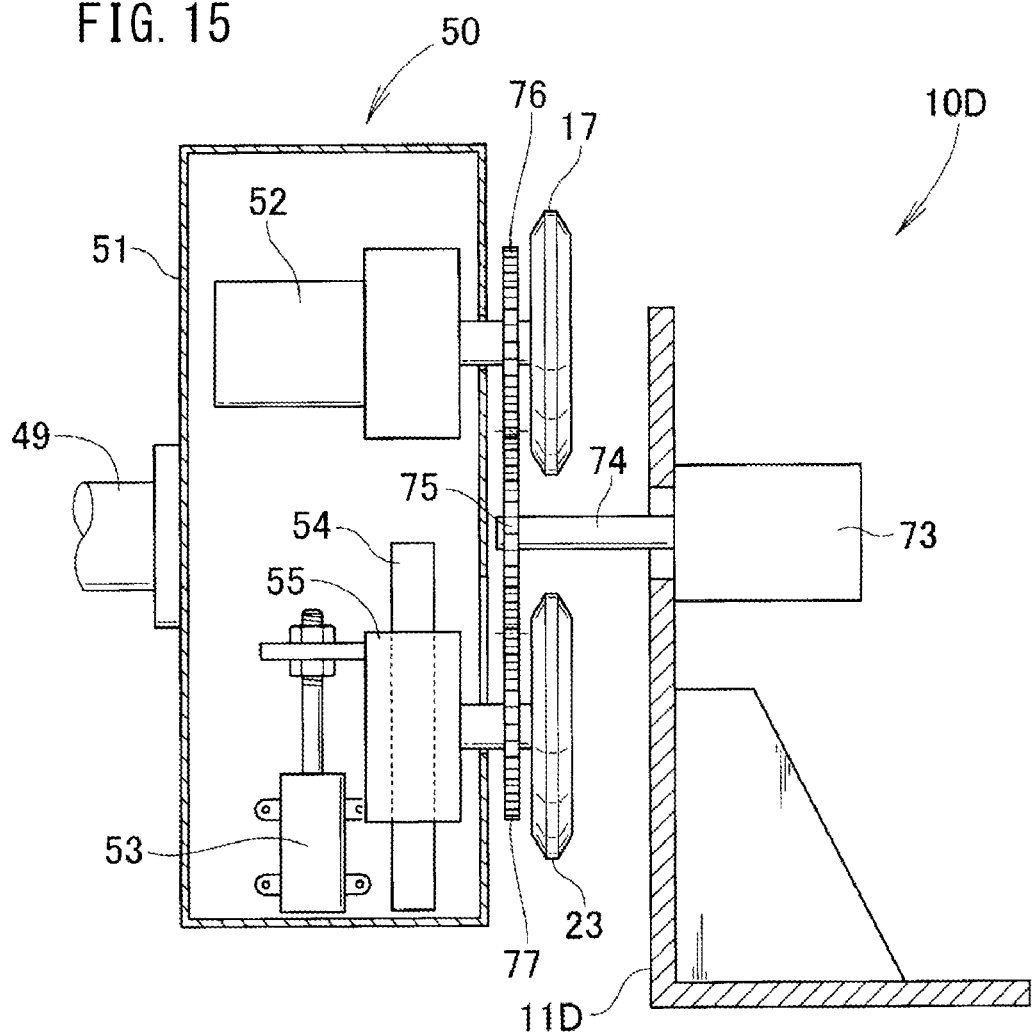

BACKGROUND ART

SHAPING DEVICE FOR ROLLER ELECTRODE FOR SEAM WELDING

TECHNICAL FIELD

The present invention relates to a shaping technique for roller electrode for seam welding.

BACKGROUND ART

A plurality of metal plates are stacked together, and in this state, the metal plates are sandwiched between a pair of roller electrodes. Then, welding current is supplied between these roller electrodes. As a consequence, metal is melted by Joule heat, and a welding bead is generated between the metal plates. By rotating the roller electrode, the resulting welding bead has a linear shape referred to as the "seam".

In seam welding, the roller electrode is pressed against the metal plate. Then, the roller electrode becomes hot by Joule heat. Due to the pressure and the temperature, wear or plastic deformation of the roller electrode (hereinafter referred to as the "deformation") proceeds proportional to the used time and the used frequency. Processing to restore the shape of the roller electrode to its original shape is performed when this deformation reaches a certain limit, or periodically. This processing is referred to as the "shaping".

The welding robot includes a robot, and roller electrodes attached to an arm of the robot. In recent years, it has been common to adopt a technique where shaping of the roller electrodes is performed while the roller electrodes remain attached to the arm of the robot (e.g., see patent document 1).

A technique of the patent document 1 will be described with reference to FIG. 16.

As shown in FIG. 16, a seam welding apparatus 102 is attached to a robot 101. The seam welding apparatus 102 includes a welding electrode 103 on the side where the pressure is applied and a welding electrode 104 on the side where the pressure is received. Further, the electrode shaping mechanism 105 is provided independently from the robot 101. The electrode shaping mechanism 105 has a shaping tool 106.

After performing seam welding multiple times, the welding electrode 103 and the welding electrode 104 are deformed. At this time, the robot 101 moves the welding electrode 103 and the welding electrode 104 toward the electrode shaping mechanism 105. The welding electrode 103 and the welding electrode 104 are rotated by an electrode motor provided in the seam welding apparatus 102. The welding electrode 103 and the welding electrode 104 are brought into contact with the shaping tool 106 to cut, and thus, shape the welding electrode 103 and the welding electrode 104.

At the time of seam welding, an electrode motor provided in the seam welding apparatus 102 generates a torque which allows the welding electrode 103 and the welding electrode 104 to roll on a metal plate. The torque is larger than the rolling resistance. Hereinafter, this torque is referred to as the "counter-rolling-resistance torque".

Further, at the time of shaping by cutting, the electrode motor generates a torque which is sufficient to overcome the reaction force applied to the shaping tool 106 in the circumferential direction when the welding electrode 103 and the welding electrode 104 are rotated. Hereinafter, this torque will be referred to as the "counter-cutting-resistance torque".

The counter-cutting-resistance torque is significantly larger than the counter-rolling-resistance torque.

Further, as a technique alternative to the technique of shaping by cutting, a plastic deforming approach by pressing the welding electrode 103 and the welding electrode 104 against the shaping roller is known. In both of shaping by cutting and plastic shaping, the welding electrode 103 and welding electrode 104 are pressed hard against the shaping tool and the shaping roller. The large pressing force is generated at a joint motor of the robot 101.

In order to generate a large counter-cutting-resistance torque or a large pressing force, a large electrode motor is required. The large electrode motor is heavy. The seam welding apparatus 102 becomes large and heavy because the large and heavy electrode motor is provided in the seam welding apparatus 102.

Due to movement of the large and heavy welding apparatus 102, or hard pressing of the electrodes, the load on the robot 101 becomes large. In order to withstand the large load, it is required to increase the rigidity of the robot 101 itself, and increase the size of the joint motor provided at the joint of the robot 101. Consequently, the robot 101 becomes heavy and large, and the robot acquisition cost and the robot operation cost for the robot become large.

In consideration that there is a demand for reduction of the size and the operation cost of the robot, it is desired to provide a shaping device and a shaping method for roller electrode for seam welding in which reduction of the load on the robot is achieved.

PRIOR ART DOCUMENT

Patent Document

PATENT DOCUMENT 1: Japanese Patent No. 5041265

SUMMARY OF THE INVENTION

Problems to be Solved by the Invention

An object of the present invention is to provide a shaping device and a shaping method for roller electrode for seam welding in which reduction of the load on the robot is achieved.

Means for Solving the Problems

In a first aspect of the invention, a shaping device for roller electrode for seam welding is provided. The shaping device shapes a first roller electrode and a second roller electrode attached to an arm of a robot.

The shaping device is provided independently from the robot, within a swing range of the arm.

The shaping device includes first and second rollers provided on a line perpendicular to a line connecting rotation centers of the first and second roller electrodes, and configured to contact the outer circumferences of the first and second roller electrodes, and a roller drive source configured to drive at least one of the first roller and the second roller.

In a second aspect of the invention, preferably, the shaping device includes a machine frame rotatably supporting the first roller and the second roller, and a first slider and a second slider attached to the machine frame in a manner that the first slider and the second slider are movable along a line connecting rotation centers of the first and second roller electrodes, a first holding mechanism provided for the first slider, and configured to hold the outer circumference of the first roller electrode, and a first cutting tool attached to the first slider in a manner that the first cutting tool is movable toward the rotation center of the first roller electrode, and configured to cut the outer circumference of the first roller electrode held by the first holding mechanism, a second holding mechanism provided for the second slider, and configured to hold the outer circumference of the second roller electrode, and a second cutting tool attached to the second slider in a manner that the second cutting tool is movable toward the rotation center of the second roller electrode, and configured to cut the outer circumference of the second roller electrode held by the second holding mechanism.

In a third aspect pf the invention, preferably, the shaping device includes a machine frame rotatably supporting the first roller and the second roller, and the first roller has a shaping groove configured to rotate, press and plastically deform the outer circumferences of the first and second roller electrodes to shape the first and second roller electrodes.

In a fourth aspect of the invention, a shaping method for roller electrode for seam welding is provided. The shaping method is performed for shaping a first roller electrode and a second roller electrode attached to an arm of a robot, when the first and second electrodes are deformed beyond an allowable limit by friction or pressure, in seam welding performed by stacking a plurality of workpieces, sandwiching the workpieces between first and second roller electrodes, and energizing.

The method includes the steps of preparing first and second rollers and first and second cutting tools provided independently from the robot, within a swing range of the arm, operating the robot to bring the outer circumferences of the first and second roller electrodes into contact with the outer circumferences of the first and second roller electrodes while sandwiching the first and second rollers between the first roller electrode and the second roller electrode, rotating at least the first roller by a roller drive source to rotate the first and second roller electrodes and the second roller synchronously, and cutting and shaping the first roller electrode in rotation with the first cutting tool and cutting and shaping the second roller electrode with the second cutting tool.

In a fifth aspect of the invention, a shaping method for roller electrode for seam welding is provided. The shaping method is performed for shaping a first roller electrode and a second roller electrode attached to an arm of a robot, when the first and second electrodes are deformed beyond an allowable limit by friction or pressure, in seam welding performed by stacking a plurality of workpieces, sandwiching the workpieces between first and second roller electrodes, and energizing.

The method includes the steps of preparing a first roller having a shaping groove in the outer circumference of the first roller, providing the first roller and a second roller different from the first roller independently from the robot, within a swing range of the arm, operating the robot to bring the outer circumferences of the first and second roller electrodes into contact with the outer circumferences of the first and second rollers while sandwiching the first and second rollers between the first roller electrode and the second roller electrode, rotating at least the first roller by a roller drive source to rotate the first and second roller electrodes and the second roller synchronously, and plastically deforming and shaping the first roller electrode in rotation with the shaping groove of the first roller, and plastically deforming and shaping the second roller electrode with the shaping groove of the first roller.

In a sixth aspect of the invention, a shaping device for roller electrode for seam welding is provided. The shaping device shapes a first roller electrode and a second roller electrode attached to an arm of a robot.

The shaping device is provided independently from the robot, within a swing range of the arm.

A first roller and a second roller are provided on a line perpendicular to a line connecting rotation centers of the first and second roller electrodes, and configured to be sandwiched between the first and second roller electrodes to position the first and second roller electrodes.

In a seventh aspect of the invention, preferably, at least one of the first roller and the second roller includes a shaping groove configured to rotate, and shape the outer circumferences of the first and second roller electrodes.

In an eighth aspect of the invention, preferably, the shaping device includes a roller drive source configured to drive at least one of the first roller and the second roller.

In a ninth aspect of the invention, preferably, the first roller and the second roller have the same outer diameter.

Advantages of the Invention

In the first aspect of the invention, the shaping device is provided independently from the robot. The roller drive source is provided for the shaping device which is provided independently. Using this roller drive source, it is possible to generate a counter-cutting-resistance torque against the cutting resistance. Since there is no need to provide a large and heavy motor for the robot, it is possible to provide the shaping device for the roller electrode for seam welding in which reduction of the load on the robot is achieved.

In the second aspect of the invention, the first and second holding mechanisms are provided. The first holding mechanism holds the outer circumference of the first roller electrode. Therefore, even if the outer diameter of the first roller electrode changes, the first cutting tool can be oriented toward the rotation center of the first roller electrode. Likewise, the second holding mechanism holds the outer circumference of the second roller electrode. Therefore, even if the outer diameter of the second roller electrode changes, the second cutting tool can be oriented toward the rotation center of the second roller electrode. Accordingly, since the pressing force by the cutting tool is oriented toward the rotation center, the desired cutting performance is achieved.

In the third aspect of the invention, the first roller has the shaping groove. Further, the shaping device includes the first and second rollers, and the machine frame rotatably supporting the first roller and the second roller. Accordingly, the shaping device is simplified significantly, and reduction in the cost of the shaping device is achieved.

In the fourth aspect of the invention, the shaping device including the first and second rollers and the first and second cutting tools is provided independently from the robot. The shaping device which is provided independently has the roller drive source. Using this roller drive source, it is possible to generate a counter-cutting-resistance torque against the cutting resistance. Since there is no need to provide a large and heavy motor for the robot, it is possible to provide the shaping method for the roller electrode for seam welding in which reduction of the load on the robot is achieved.

In the fifth aspect of the invention, the shaping groove is provided for the first roller, and the shaping device having the first and second rollers are provided independently from the robot. The roller drive source is provided for the shaping device which is provided independently. Using this roller drive source, it is possible to generate a counter-rolling-resistance torque against the rolling resistance. Since there is no need to provide a large and heavy motor for the robot, it is possible to provide the shaping method for the roller electrode for seam welding in which reduction of the load on the robot is achieved.

In the sixth aspect of the invention, the first and second rollers are provided. The first and second rollers sandwiched between the first and second roller electrodes determine positions of the first and second roller electrodes.

A function of sandwiching (holding) the stacked workpieces by a large force is inherently present between the first and the second roller electrodes. Using this function, by sandwiching the first and second rollers between the first and second roller electrodes, it is possible to perform positioning of the first and second roller electrodes relative to the shaping device.

In the seventh aspect of the invention, at least one of the first roller and the second roller includes the shaping groove for shaping the outer circumferences of the first and second roller electrodes during rotation.

Shaping of the outer circumferences of the first and second roller electrodes is performed by pressing the first and second roller electrodes against the shaping grooves to be subjected to plastic working. The holding function which is inherently present between the first and second roller electrodes is used as the pressing force against the first and second roller electrodes. Therefore, there is no concern that the load on the robot arm is increased, and it is possible to reduce the size of the robot arm.

In the eighth aspect of the invention, the roller drive source configured to drive at least one of the first roller and the second roller is provided.

Since the roller drive source is provided on the part of the shaping device, it becomes possible to generate a force or a speed which is equal to or greater than those offered by the roller electrode, and improvement in the shaping performance is expected.

In the ninth aspect of the invention, the first roller and the second roller have the same diameter.

Since the first roller and the second roller have the same diameter, the positional relationship between the line connecting the rotation centers of the first and second rollers and the line connecting the rotation centers of the first and second roller electrodes remain the same.

Since the positional relationship between the line connecting the rotation centers of the first and second rollers and the line connecting the rotation centers of the first and second roller electrodes does not change, there is no need to change the position of the robot significantly at the time of shaping, and control of the robot is simplified, and becomes easy.

BRIEF DESCRIPTION OF DRAWINGS

FIG. 6 is a view showing a shaping method according to the present invention;

FIG. 8 is a front view showing a modified example of the shaping device for the roller electrode for seam welding according to the present invention;

FIG. 10 is a view showing operation in the modified example;

FIG. 12 is a plan view showing a vehicle body welding line;

FIG. 14 is a cross sectional view showing another modified example of the shaping device for the roller electrode for seam welding according to the present invention;

FIG. 15 is a cross sectional view showing still another modified example of the shaping device for the roller electrode used in seam welding according to the present invention.

DESCRIPTION OF EMBODIMENTS

Hereinafter, preferred embodiments of the present invention will be described with reference to the accompanying drawings.

Embodiment

Figure 1:
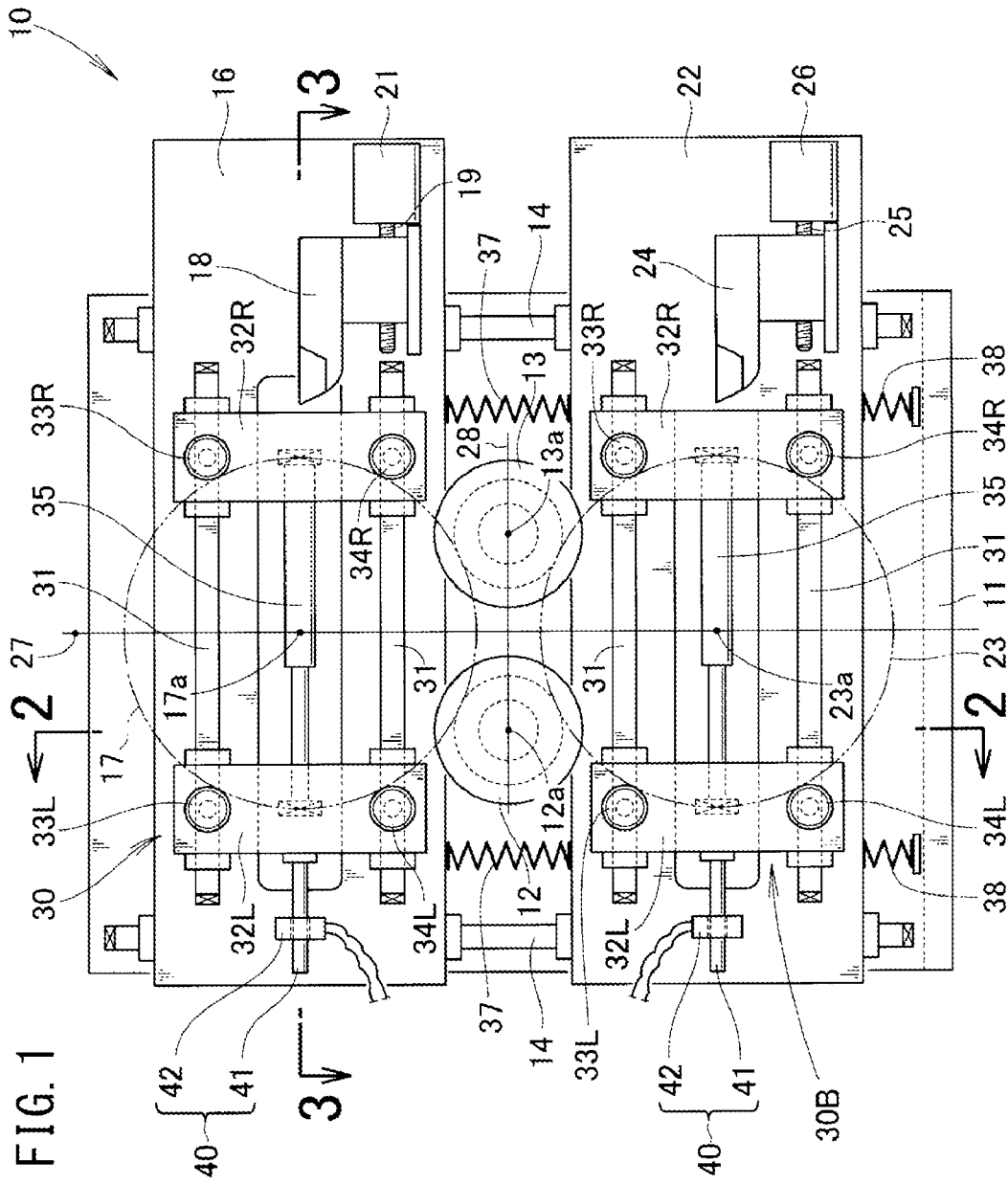
FIG. 1 is a front view showing a shaping device for roller electrode for seam welding according to the present invention.

As shown in FIG. 1, a shaping device 10 for roller electrode for seam welding includes a machine frame 11 fixed to a base or a structure, a first roller 12 and a second roller 13 attached rotatably to a central part of the machine frame 11, two vertical rails 14, 14 provided on a front surface of the machine frame 11, a first slider 16 provided on one side (upper side in this example) of the first and second rollers 12, 13 and vertically movably supported by the vertical rails 14, 14, a first holding mechanism 30 provided on a front surface of the first slider 16 for holding the outer circumference of the first roller electrode 17, a feed screw 19 provided at the first slider 16 for feeding a first cutting tool 18 toward the first roller electrode 17, rotation means 21 for rotating the feed screw 19, a second slider 22 provided on the other side (lower side in this example) of the first and second rollers 12, 13 and vertically movably supported by the vertical rails 14, 14, a second holding mechanism 30B provided on a front surface of the second slider 22 for holding the outer circumference of the second roller electrode 23, a feed screw 25 provided at the second slider 22 for feeding a second cutting tool 24 toward the second roller electrode 23, and rotation means 26 for rotating the feed screw 25.

A line 27 connecting the rotation center 17a of the first roller electrode 17 and the rotation center 23a of the second roller electrode 23 is a vertical line, and a line 28 connecting the rotation center 12a of the first roller 12 and the rotation center 13a of the second roller 13 is a horizontal line. The line 27 and the line 28 are perpendicular to each other.

The rotation centers 12a, 13a of the first and second rollers 12, 13 are provided separately on both sides of the line 27 connecting the first and second roller electrodes 17, 23.

The first holding mechanism 30 includes two lateral rails 31, 31 provided on a front surface of the first slider 16, left and right sub-sliders 32L, 32R (L and R are suffixes denoting left and right, respectively. The suffixes L and R used in the following description also denote left and right, respectively.) movably supported by the lateral rails 31, 31, an upper left pinch roller 33L and a lower left pinch roller 34L rotatably provided at the left sub-slider 32L, an upper right pinch roller 33R and a lower right pinch roller 34R rotatably provided at the right sub-slider 32R, and a cylinder unit 35 bridging the left and right sub-sliders 32L, 32R. The four pinch rollers 33L, 33R, 34L, and 34R are provided around the first roller electrode 17.

The second holding mechanism 30B has the same structure as the first holding mechanisms 30. Therefore, components of the second holding mechanism 30B are labeled with the same reference numerals, and description thereof is omitted. Pinch rollers 33L, 33R, 34L, and 34R are provided around the second roller electrode 23.

Preferably, the first springs 37, 37 are interposed between the first and second sliders 16, 22, and second springs 38, 38 pushing up the second slider 22 at the lower level are provided. The second spring 38 can keep the second slider 22 at its stand-by position (initial position) and the first spring 37 can keep the first slider 16 at its stand-by position (initial position).

That is, the first and second sliders 16, 22 are supported in a floating manner. When an external force is applied to the first and second sliders 16, 22, the first and second sliders 16, 22 move up or down, and when no external force is applied to the first and second sliders 16, 22, the first and second sliders 16, 22 return to their stand-by positions (initial positions).

Though not shown in FIG. 1, the shaping device 10 may be provided with both or one of an upper slider moving mechanism for moving the first slider 16 back and forth toward the second slider 22, and a lower slider moving mechanism for moving the second slider 22 back and forth toward the first slider 16. The slider moving mechanisms can generate forces to push the first and second roller electrodes 17, 23 toward the first and second rollers 12, 13.

Figure 2:
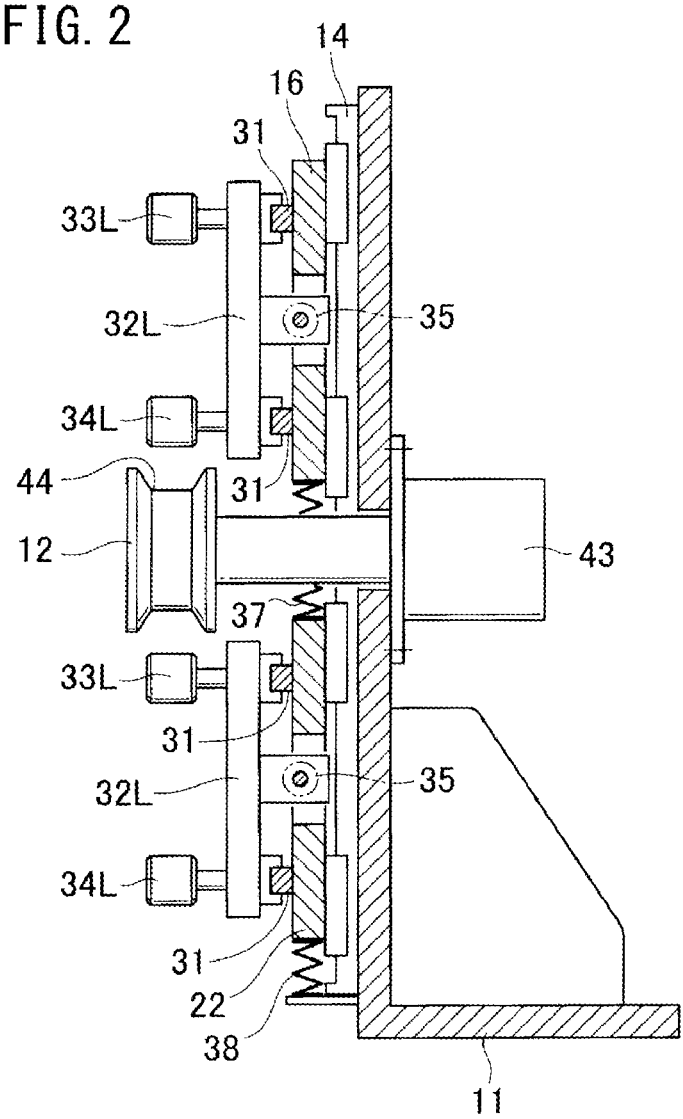
FIG. 2 is a cross sectional view taken along a line 2-2 in FIG. 1.

As shown in FIG. 2, the first and second sliders 16, 22 move vertically along the vertical rail 14, and the sub-sliders 32L, 32L move horizontally in directions from the front to the back (the back to the front) of the drawing along the lateral rails 31, 31.

The first roller 12 is rotated by a roller drive source 43 attached to the machine frame 11. The roller drive source 43 is an electric servo motor, a hydraulic servo motor, or any other rotation means. The type of the roller drive source 43 is not limited.

The first roller 12 may be a flat roller. Preferably, the first roller 12 is a roller with a groove 44 as shown in the drawings. By inserting the outer circumference of the first roller electrode (denoted by a reference numeral 17 in FIG. 1) in the groove 44, the position of the first roller electrode 17 in the axial direction is determined. It is possible to prevent detachment of the first roller electrode 17 from the pinch rollers 33L, 34L in the axial direction. The same explanation applies to the second roller (denoted by a reference numeral 13 in FIG. 1). It should be noted that the roller drive source 43 for the second roller may be omitted.

Figure 3:
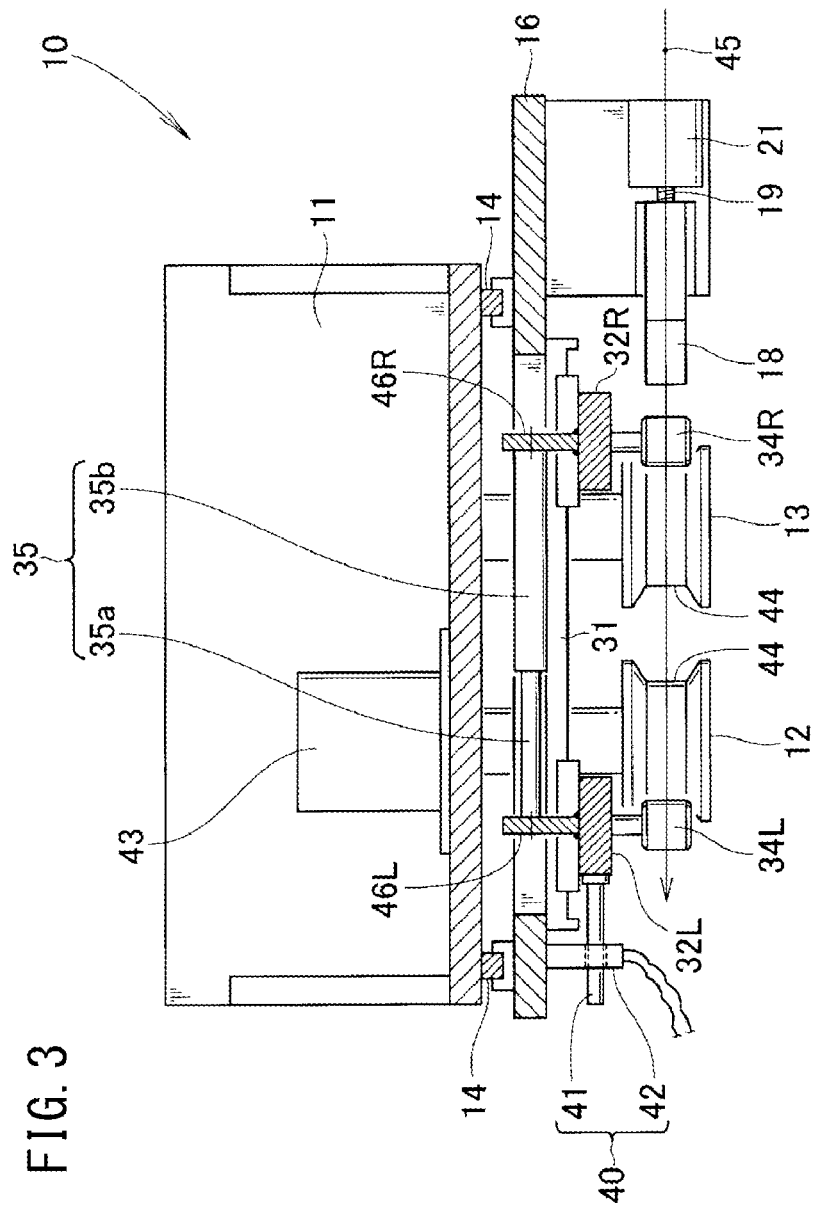
FIG. 3 is a cross sectional view taken along a line 3-3 in FIG. 1.

As shown in FIG. 3, the first roller 12 has the roller drive source 43. The second roller 13 does not have the roller drive source 43. Therefore, the first roller 12 works as a drive roller, and the second roller 13 is a free roller.

Further, the first cutting tool 18, the grooves 44, 44 of the first and second rollers 12, 13, and the pinch rollers 34L, 34R are provided on a common line 45. Then, the first roller electrode 17 as a shaping target is put on the common line 45.

A left arm 46L extends from the left sub-slider 32L toward the back surface, and a right arm 46R extends from the right sub-slider 32R toward the back surface. For example, a piston rod 35a is tightly coupled to the left arm 46L, and a cylinder body 35b is tightly coupled to the right arm 46R.

When the cylinder unit 35 is stretched, the distance between the left and right sub-slider 32L, 32R is increased. When the cylinder unit 35 is compressed, the distance between the left and right sub-slider 32L, 32R is decreased.

The left and right sub-sliders 32L, 32R are coupled together mechanically by a cylinder unit 35. If there is a sufficient friction force between the lateral rail 31 and the sub-sliders 32L, 32R, no lateral movement occurs. If the friction force is decreased by applying lubricant oil, unnecessary movement may occur. For example, in many production sites, the floor may slightly vibrate. Due to the vibration, the left and right sub-sliders 32L, 32R and the cylinder unit 35 may move together. As a countermeasure to eliminate this possibility, it is preferable to use brake mechanisms 40 as described below.

The brake mechanisms 40 may be configured to adopt any system (structure, principle). For example, the brake mechanisms 40 include rods 41 extending horizontally from the sub-sliders 32L, 32L and electromagnetic brakes 42, 42 provided for the first and second sliders 16, 22. When the brake mechanism 40 is energized, the rod 41 is clamped, and when the brake mechanism 40 is deenergized, the rod 41 is unclamped.

Figure 4:
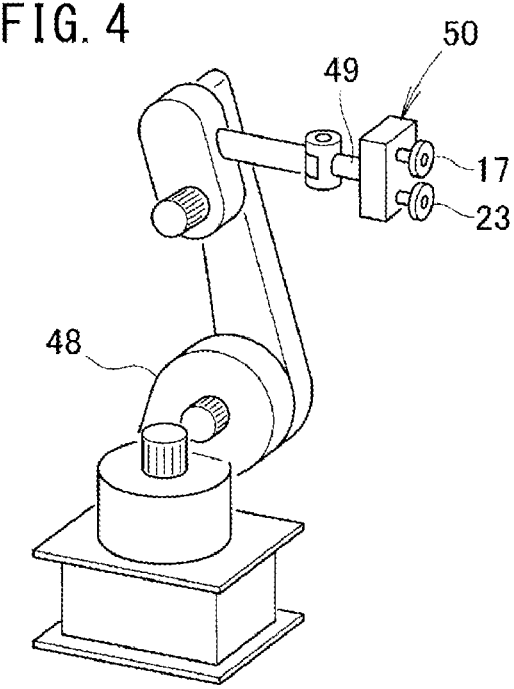
FIG. 4 is a perspective view showing a robot having a seam welding mechanism.

As shown in FIG. 4, the robot 48 includes a seam welding mechanism 50 at its arm 49.

Figure 5:
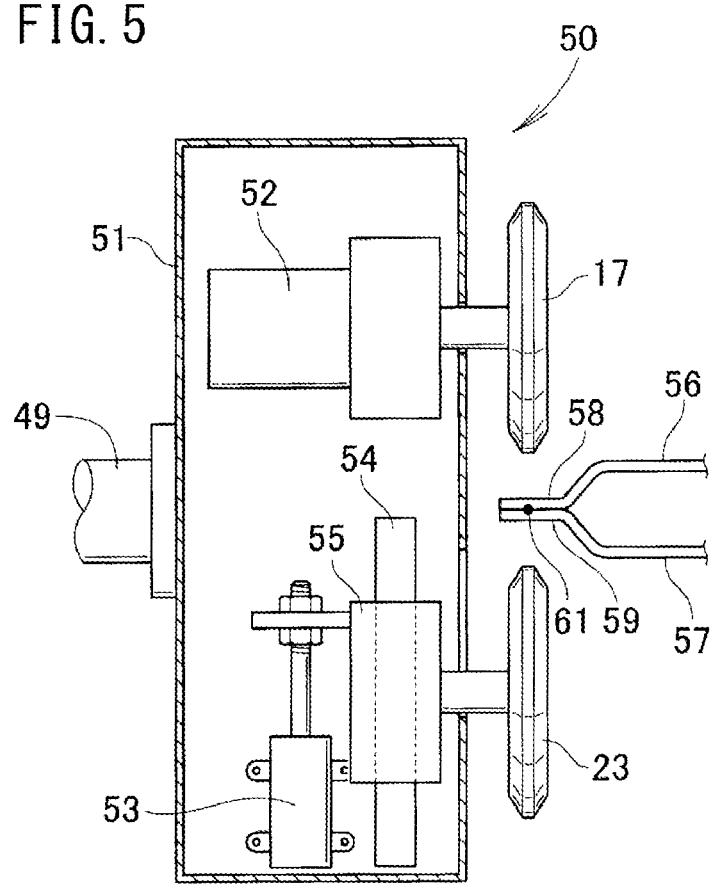
FIG. 5 is a cross sectional view showing the seam welding mechanism.

As shown in FIG. 5, the seam welding mechanism 50 includes a casing 51 supported by the arm 49, a first roller electrode drive source 52 provided in the casing 51, a first roller electrode 17 supported by the first roller drive source 43 and provided outside the casing 51, a second roller electrode moving mechanism 53 provided inside the casing 51, a guide 54 provided in the casing 51 in a manner to extend vertically, a slidable piece 55 fitted movably to the guide 54, and a second roller electrode 23 supported rotatably by the slidable piece 55 and provided outside the casing 51.

A plurality of work pieces in the form of metal plates (e.g., first and second workpieces) 56, 57 are stacked together. A first flange 58 and a second flange 59 are sandwiched between the first and second roller electrodes 17, 23 to supply welding current between the first and second roller electrodes 17, 23. As a result, a welding bead 61 can be created between the first and second flanges 58, 59. By rotating the first roller electrode 17 using the first roller electrode drive source 52, the first and second roller electrodes 17, 23 move relatively in directions from the front to the back (the back to the front) of the drawing, and a welding bead 61 in the form of a line called seam is generated.

It is preferable to control both of the drive sources 43, 52 synchronously so that rotation of the first roller electrode drive source 52 and rotation of the roller drive source (denoted by a reference numeral 43 in FIG. 3) coincide. Preferably, the rotation speeds of both drive sources 43, 52 are monitored. If there is any difference between these rotational speeds, it is determined that an abnormality has occurred, and warning such as an alarming sound is outputted.

The first and second roller electrodes 17, 23 simply rotate along the first and second flanges 58, 59. Therefore, the load applied to the first roller electrode drive source 52 is significantly small in comparison with the cutting load by a cutting tool as described later. Therefore, it is not necessary to increase the size and weight of the first roller drive source 43, and there is no concern of the increase of the load on the arm 49 of the robot.

Operation of the shaping device 10 for the roller electrode for seam welding as described above will be described below.

As shown in FIG. 6, the first and second rollers 12, 13 and the first and second cutting tools 18, 24 are provided independently from the robot 48 and prepared within the swing range of the arm 49. When shaping become required, the robot 48 is operated to move the first roller electrode 17 to a position above the first and second rollers 12, 13, and move the second roller electrode 23 to a position below the first and second rollers 12, 13.

At this time, the pinch rollers 33L, 33R, 34L, and 34R shown in FIG. 1 are at their standby positions, and the positions are maintained by the brake mechanism 40. Therefore, unwanted movement of the pinch rollers 33L, 33R, 34L, and 34R does not occur before the movement comes to the operator's attention. The first and second roller electrodes 17, 23 can be positioned adjacent to the pinch rollers 33L, 33R, 34L, and 34R kept at the fixed positions.

Figure 7A:
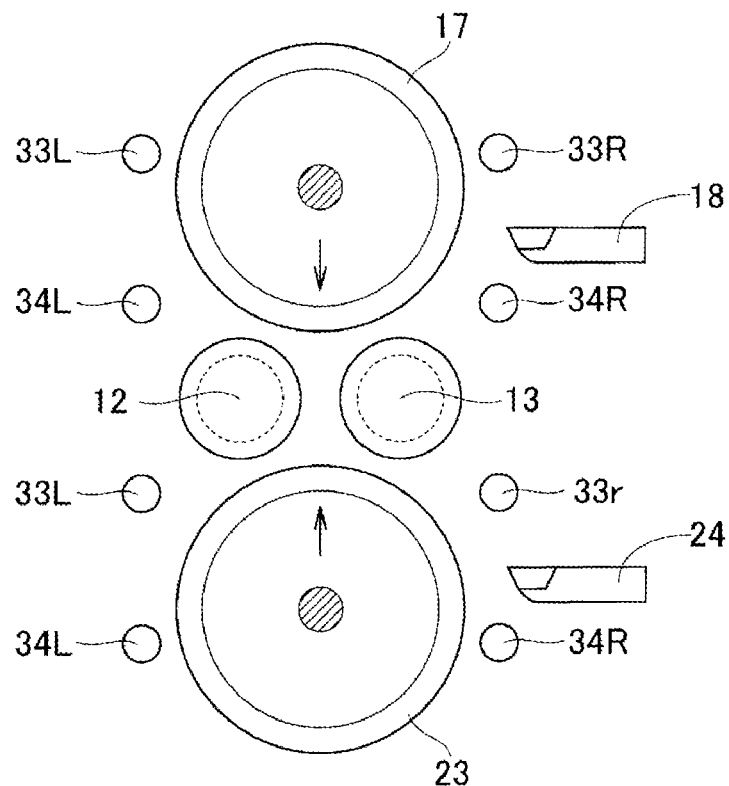
FIG. 7 is a view showing a series of steps from a step of bringing first and second roller electrodes into contact with first and second rollers to a shaping step.
Figure 7B:
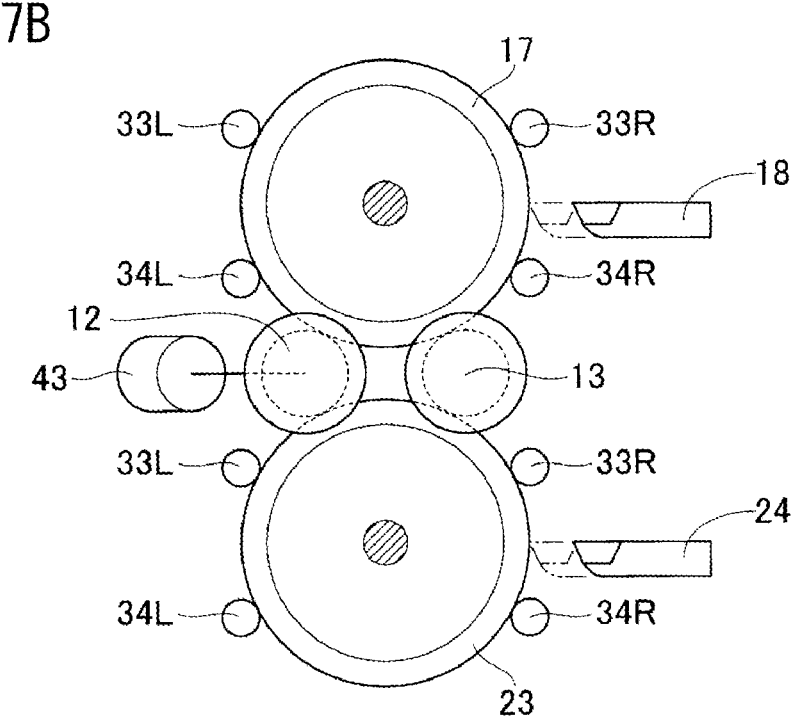

The second roller electrode moving mechanism 53 in FIG. 5 is operated, and as shown in FIG. 7(*a*), the distance between the first and second roller electrodes 17, 23 is reduced, and the first and second rollers 12, 13 are sandwiched between the first roller electrode 17 and the second roller electrode 23. In the meanwhile, the first roller electrode 17 and the second roller electrode 23 do not contact the pinch rollers 33L, 33R, 34L, and 34R. Therefore, the first and second sliders 16, 22 shown in FIG. 1 do not move vertically.

As shown in FIG. 7(*b*), the first and second rollers 12, 13 are flanked by the first roller electrode 17 and the second roller electrode 23. In this state, the upper left pinch roller 33L and the upper right pinch roller 33R are moved closer to each other, and the lower left pinch roller 34L and the lower right pinch roller 34R are moved closer to each other. Consequently, the first and second springs 37, 38 in FIG. 1 are stretched/compressed and the first slider 16 moves up or down so that the tip of the first cutting tool 18 is aligned with the center of the first roller electrode 17. The second slider 22 is operated in the same manner.

The brake mechanisms 40, 40 shown in FIG. 1 are placed in the braking state (where the pinch rollers 33L, 34L do not move). In this state, there is no concern that unwanted movement of the first and second roller electrodes 17, 23 occurs.

In FIG. 7(*b*), the roller drive source 43 rotates the first roller 12. Then, the first and second roller electrodes 17, 23 and the second roller 13 are rotated synchronously.

The first roller electrode 17 in rotation is cut and shaped by the first cutting tool 18, and the second roller electrode 23 is cut and shaped by the second cutting tool 24.

When the first cutting tool 18 cuts into the outer circumference of the first roller electrode 17, a large cutting resistance is generated. The first roller drive source 43 generates the counter-cutting-resistance torque beyond this cutting resistance. In FIG. 6, the first roller drive source 43 is not provided for the robot 48, but for the shaping device 10. Therefore, even if the size and the weight of the roller drive source 43 are increased, no load is applied to the robot 48.

Next, a modified example will be described.

As shown in FIG. 8, the shaping device 10B for the roller electrode for seam welding includes a machine frame 11B and a first roller 12B and a second roller 13 provided for the machine frame 11B. The first roller 12B includes a roller drive source 43.

Figure 9:
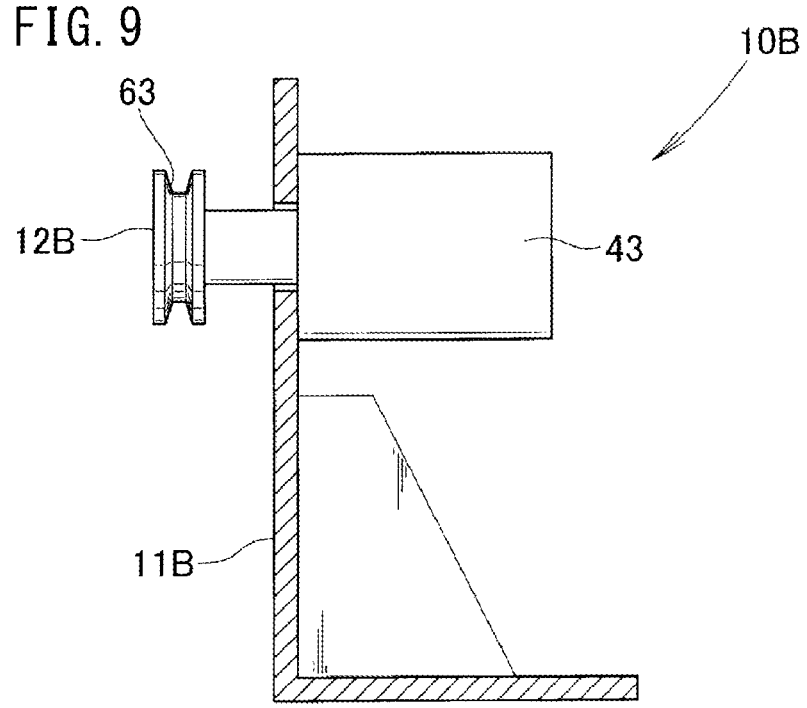
FIG. 9 is a cross sectional view taken along a line 9-9 in FIG. 8.

As shown in FIG. 9, the first roller 12B is a special, grooved roller having a shaping groove 63 with the same cross section as the cross section of the outer circumference of a brand new first roller electrode 17. The second roller (denoted by a reference numeral 13 in FIG. 8) may be identical to the first roller 12 or a simple, grooved roller like the first roller 12 shown in FIG. 2. However, for the purpose of reducing the time required for the shaping process, it is preferable that the second roller 13 is also a special, grooved roller having the shaping groove 63.

Next, operation of a shaping device 10B for the roller electrode for seam welding will be described below.

As shown in FIG. 10, a first roller 12B and a second roller 13 which is different from the first roller 12B are provided within a swing range of the arm 49 and independently from the robot 48.

The robot 48 is operated to bring the outer circumferences of the first and second roller electrodes 17, 23 in contact with the outer circumferences of the first and second rollers 12B, 13 in a manner that the first and second rollers 12B, 13 are sandwiched between the first roller electrode 17 and the second roller electrode 23.

It should be noted that the outer diameters of the first and second rollers 12B, 13 may be the same, or different. However, preferably, the first and second rollers 12B, 13 have the same diameter for the following reasons.

Since the first roller 12B and the second roller 13 have the same diameter, even if the diameters of the first and second roller electrodes 17, 23 change, the positional relationship between the line connecting the rotation centers of the first and second rollers 12B, 13 and the line connecting the rotation centers of the first and second roller electrodes 17, 23 remain the same.

Since the positional relationship between the line connecting the rotation centers of the first and second rollers 12B, 13 and the line connecting the rotation centers of the first and second roller electrodes 17, 23 does not change, there is no need to significantly change the position of the robot 48 at the time of shaping, and control of the robot 48 is simplified, and becomes easy.

For the same reason, it is preferable that the first and second rollers 12, 13 shown in FIG. 6 have the same diameter.

In FIG. 10, before, at, or after the timing of bringing the outer circumferences of the first and second roller electrodes 17, 23 into contact with the outer circumferences of the first and second rollers 12B, 13, the first roller 12B is rotated. Then, the second roller electrode moving mechanism 53 shown in FIG. 5 moves the second roller electrode 23 toward the first roller electrode 17.

Figure 11A:
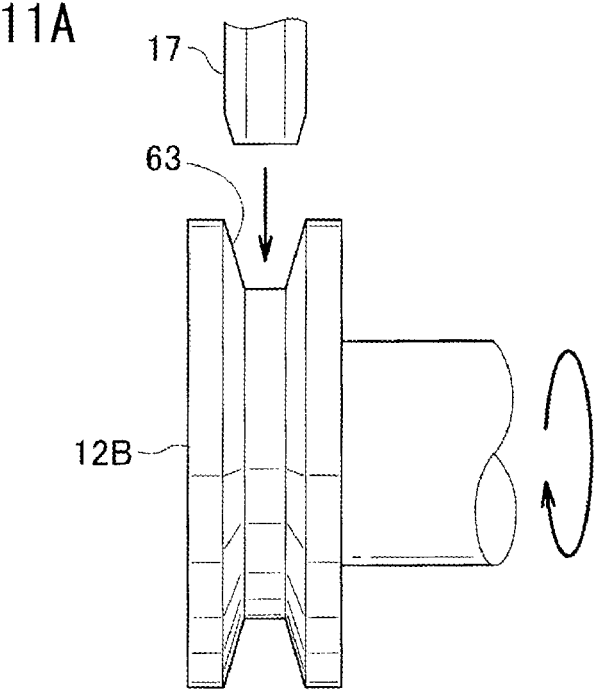
FIG. 11 is a view showing correlation between first and second rollers and first and second roller electrodes in the modified example.
Figure 11B:
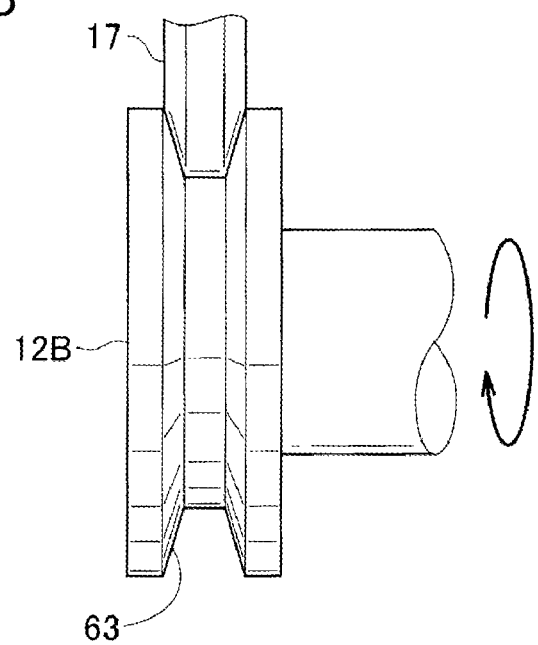

That is, in FIG. 11 (*a*), the first roller electrode 17 having the deformed outer circumference is pressed against the shaping groove 63 of the first roller 12B which is rotating.

As shown in FIG. 11(*b*), the outer circumference of the first roller electrode 17 is deformed plastically by the shaping groove 63. As a result, the outer circumference of the first roller electrode 17 has the same shape as the shaping groove 63.

As a result of plastic working, the rolling resistance of the first roller 12 is increased. However, the load of the first roller 12 is supported by the roller drive source 43 shown in FIG. 9. Plastic working requires a smaller torque for rotating the roller electrode than cutting. Therefore, in the case where plastic working can be performed by the rotational force of the roller electrode itself, no roller drive source 43 is required for the first and the second roller electrodes 17, 23.

In this regard, the following differences are present between shaping by cutting and shaping using the shaping groove.

Shaping by cutting can be performed regardless of the degree of deformation. In contrast, since the cutting debris is removed from the first and second roller electrodes 17, 23, the diameters of the first and second roller electrodes 17, 23 become small, and the product life of the first and second roller electrodes 17, 23 becomes short.

In shaping using the shaping groove, since no cutting debris is generated, changes in the diameters of the first roller electrode 17 and the second roller electrode 23 are small, and the product life of the first and second roller electrodes 17, 23 becomes long. However, shaping using the shaping groove is preferable in the case where deformation is small. If deformation is large, shaping becomes difficult.

A preferred example of a facility layout which takes the above points into account will be described below.

As shown in FIG. 12, a vehicle body 65 is transported by a transportation path 64. A robot 48 is provided on one side of the transportation path 64, and a shaping device 10 and a shaping device 10B are provided within a swing range of the robot 48. After the first and second roller electrodes 17, 23 perform seam welding to 10 to 20 units of vehicle bodies 65, the first and second rollers 17, 23 are shaped by the shaping device 10B.

Further, after the first and second roller electrodes 17, 23 applies seam welding to the vehicle body 65 for three hours, the first and second roller electrodes 17, 23 are shaped by the shaping device 10.

In the shaping device 10B shown in FIG. 10, two rollers, the first and second rollers 12B, 13 are provided. However, as shown in FIG. 13, the number of rollers can be determined arbitrarily.

Figure 13A:
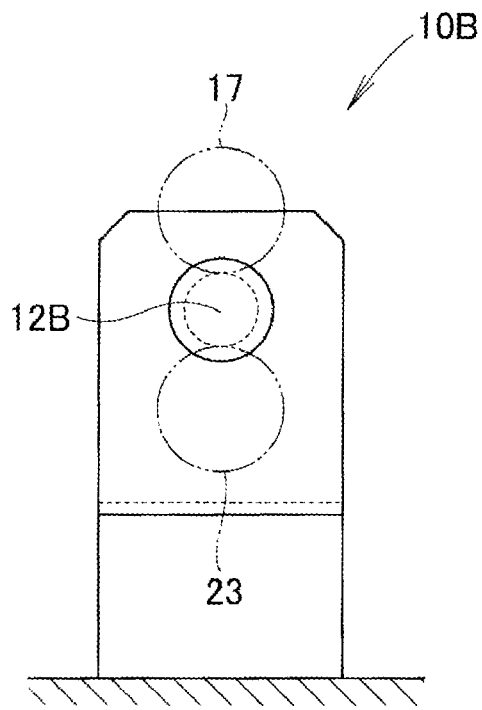
FIG. 13 is a front view showing another modified example of the shaping device for the roller electrode for seam welding according to the present invention.

That is, as shown in FIG. 13(a), only one roller, first roller 12B may be provided between the first and second electrodes 17, 23.

Figure 13B:
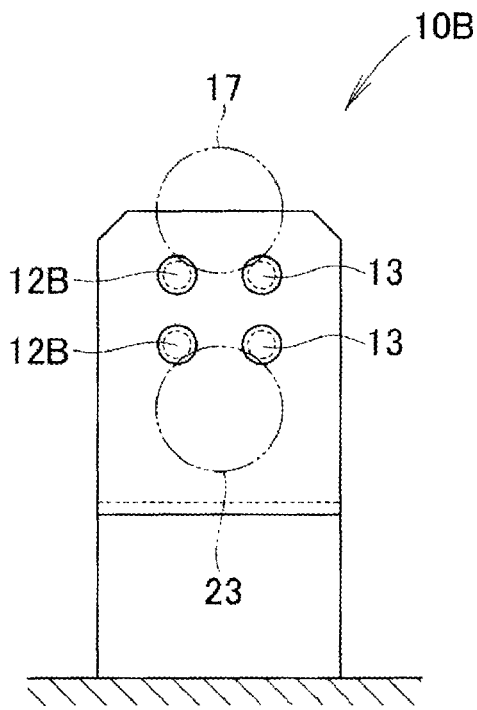

Further, as shown in FIG. 13(b), two upper and lower first rollers 12B, 12B and two upper and lower second rollers 13, 13 may be provided.

Figure 13C:
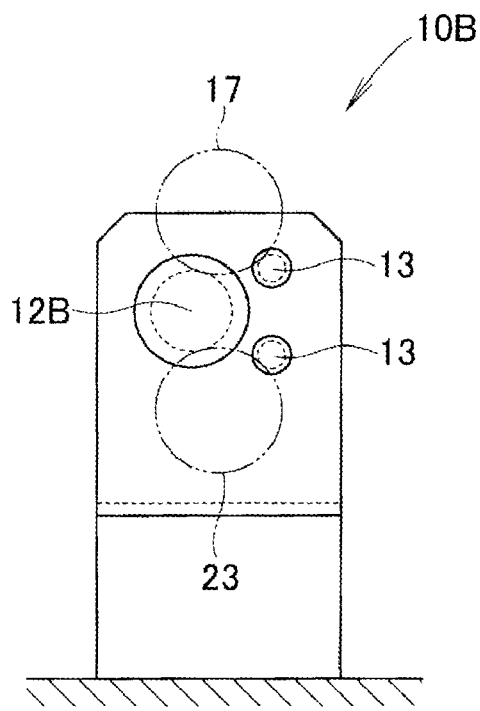
Figure 16:
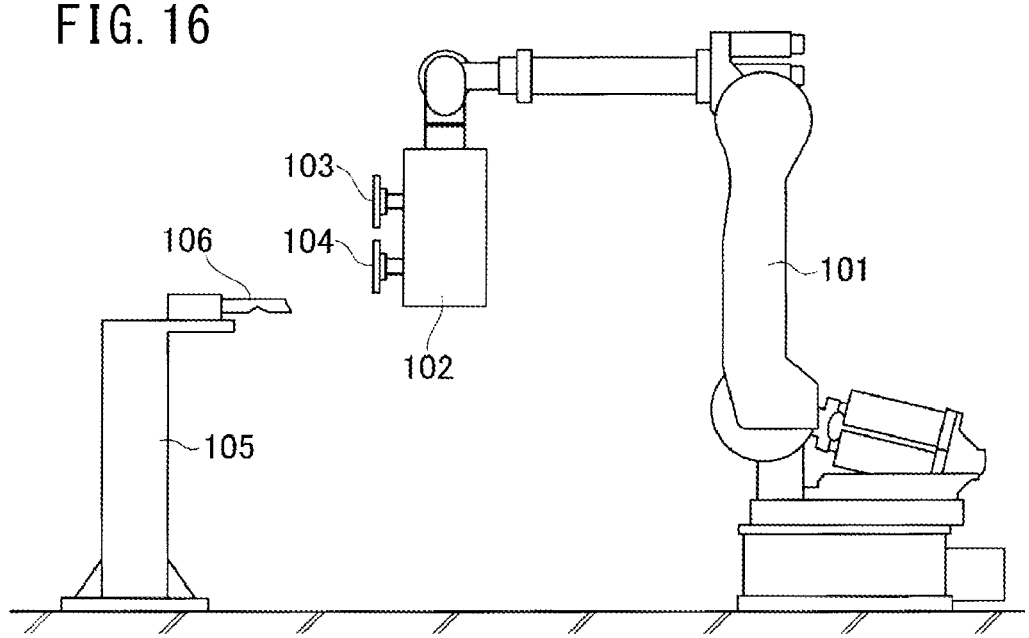
FIG. 16 is a basic structural diagram illustrating a conventional technique.

Further, as shown in FIG. 13(c), one first roller 12B and two upper and lower second rollers 13, 13 may be provided.

Further, though the first roller 12B is driven by the roller drive source 43 in FIG. 9, the first and second roller electrodes 17, 23 may be driven directly by a drive source which is different from the roller drive source 43. A specific example of this case will be described with reference to FIGS. 14 and 15.

In the shaping device 10 in FIG. 14, a first roller 12C is rotatably attached to a machine frame 11C using a bearing block 67. An upper drive source 68 is attached to the machine frame 11C above the bearing block 67. A lower drive source 69 is attached to the machine frame 11C below the bearing block 67. Front ends of the upper and lower drive sources 68, 69 have polygonal columnar shape.

A socket 71 is fixed to the rotation center of the first roller electrode 17. A front end of the upper drive source 68 is fitted to the socket 71. The first roller electrode 17 is rotated by the upper drive source 68. At this time, the first roller electrode drive source 52 is rotatable. If the first roller electrode drive source 52 is a motor, it is possible to make the first roller electrode drive source 52 rotatable by stopping energization.

Likewise, a socket 72 is fixed to the rotation center of the second roller electrode 23, and a front end of the lower drive source 69 is fitted to the socket 72, and the second roller electrode 23 is rotated by the lower drive source 69.

Though the first and second roller electrodes 17, 23 are rotated, since the upper and lower drive sources 68, 69 are provided on the part of the shaping device 10C, there is no concern that the seam welding mechanism 50 on the part of the robot arm 49 becomes heavy.

Further, in a shaping device 10D shown in FIG. 15, a drive source 73 is provided for a machine frame 11D. A drive gear 75 is attached to a rotation shaft 74 of this drive source 73.

Further, an upper driven gear 76 is attached to the first roller electrode 17, and a lower driven gear 77 is attached to the second roller electrode 23. Since the drive gear 75 relatively moves into/out of space between a first roller (denoted by a reference numeral 12B in FIG. 8) and a second roller (denoted by a reference numeral 13 in FIG. 8), there is no concern that the drive gear 75 obstructs the first and second rollers.

It is possible to rotate the upper and lower driven gears 76, 77 with the drive gear 75 synchronously.

Though the first and second roller electrodes 17, 23 are rotated, since the drive source 73 is provided on the part of the shaping device 10D, there is no concern that the seam welding mechanism 50 on the part of the robot arm 49 becomes heavy.

In the embodiment, though there are two workpieces, the number of workpieces may be two or more. The workpieces may be iron based steel plates, typically, carbon steel plates, or light metal plates, typically, aluminum plates.

Further, in the shaping device 10 shown in FIG. 1, in the embodiment, though the first and second rollers 12, 13 are arranged on a horizontal line, the first and second rollers 12, 13 may be arranged on a vertical line or on an oblique line. It is because the orientation of the first and second roller electrodes 17, 23 can be changed freely by the robot 48. Therefore, the front surface of the machine frame 11 is not limited to the vertical surface, and may be a horizontal surface or an inclined surface.

Further, during the stand-by state, if the pinch rollers 33L, 33R do not move at all, the brake mechanisms 40, 40 shown in FIG. 1 may be omitted. In this manner, it is possible to simplify the structure, and achieve size and weight reduction of the shaping device 10 for the roller electrode for seam welding.

INDUSTRIAL APPLICABILITY

The present invention is suitable for shaping of a pair of roller electrodes.

DESCRIPTION OF REFERENCE NUMERALS 10, 10B, 10C, 10D: shaping device for roller electrode for seam welding
11, 11B, 11C, 11D: machine frame
12, 12B: first roller 12a: rotation center of first roller
13: second roller
13a: rotation center of second roller
16: first slider
17: first roller electrode
17a: rotation center of first roller electrode
18: first cutting tool
22: second slider
23: second roller electrode
23a: rotation center of second roller electrode
24: second cutting tool
27: line connecting rotation centers of first and second roller electrodes
28: line connecting rotation centers of first and second rollers
30: first holding mechanism
30B: second holding mechanism
33L, 33R, 34L, 34R: pinch roller
43: roller drive source
48: robot
49: robot arm
50: seam welding mechanism
56: workpiece (first workpiece)
57: workpiece (second workpiece)
63: shaping groove

The invention claimed is:

1. A shaping device for roller electrode for seam welding, for shaping a first roller electrode and a second roller electrode attached to an arm of a robot,
wherein the shaping device is provided independently from the robot, within a swing range of the arm of the robot,
the shaping device comprising:
a first roller and a second roller provided on a line perpendicular to a line connecting rotation centers of the first and second roller electrodes, and configured to contact outer circumferences of the first and second roller electrodes;
a roller drive source configured to drive at least one of the first roller and the second roller, and
a machine frame to which the first roller, the second roller, and the roller drive source are attached,
wherein the machine frame includes a first cutting tool configured to cut the outer circumference of the first roller electrode, and a second cutting tool configured to cut the outer circumference of the second roller electrode, and
wherein the shaping device further comprising:
a first slider and a second slider attached to the machine frame in a manner that the first slider and the second slider are movable along the line connecting rotation centers of the first and second roller electrodes;
a first holding mechanism provided for the first slider, configured to hold the outer circumference of the first roller electrode;
the first cutting tool attached to the first slider in a manner that the first cutting tool is movable toward the rotation center of the first roller electrode, and configured to cut the outer circumference of the first roller electrode held by the first holding mechanism;
a second holding mechanism provided for the second slider, and configured to hold the outer circumference of the second roller electrode; and
the second cutting tool attached to the second slider in a manner that the second cutting tool is movable toward the rotation center of the second roller electrode, and configured to cut the outer circumference of the second roller electrode held by the second holding mechanism.

2. The shaping device for roller electrode for seam welding according to claim 1, comprising the machine frame rotatably supporting the first roller and the second roller,
wherein the first roller has a shaping groove configured to rotate and shape the outer circumferences of the first and second roller electrodes.

3. The shaping device for roller electrode for seam welding according to claim 1, wherein the first roller and the second roller have equal outer diameters.

* * * * *